UNITED STATES PATENT OFFICE.

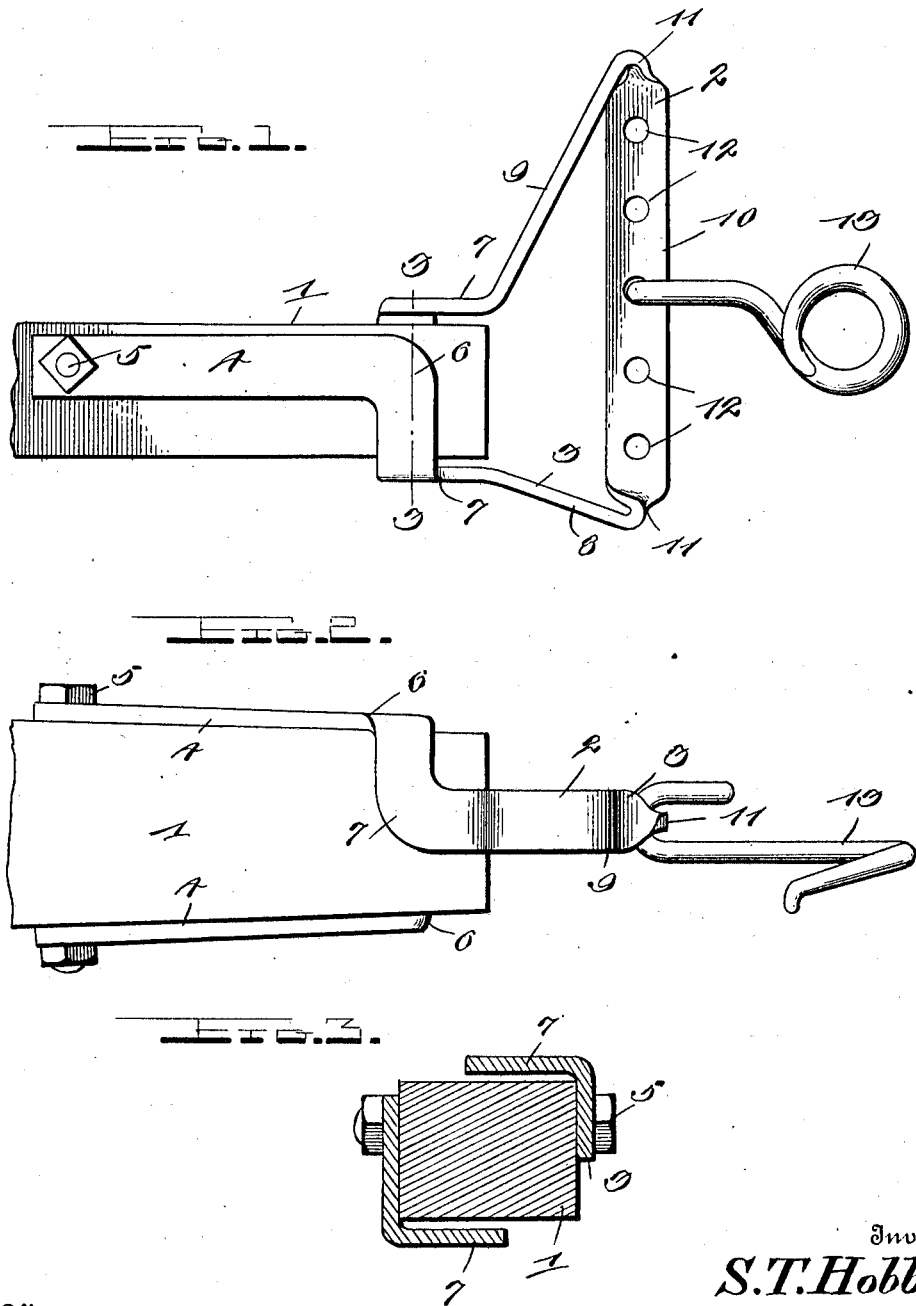

SAMUEL T. HOBBS, OF TY TY, GEORGIA.

CLEVIS.

1,040,326.  Specification of Letters Patent.  Patented Oct. 8, 1912.

Application filed April 10, 1912. Serial No. 689,778.

*To all whom it may concern:*

Be it known that I, SAMUEL T. HOBBS, a citizen of the United States, residing at Ty Ty, in the county of Tift and State of Georgia, have invented certain new and useful Improvements in Clevises, of which the following is a specification, reference being had to the accompanying drawings.

This invention relates to new and useful improvements in clevises and has for its object to provide a reversible clevis adapted to be secured to the end of a wooden plow beam.

Another object of the invention is to provide a device of this character which will possess advantages in points of efficiency and durability, is inexpensive of manufacture and at the same time is simple in construction and operation.

With the above and other objects in view, the invention consists in the novel features of construction, combination and arrangement of parts hereinafter more fully described, pointed out in the claim and shown in the accompanying drawings, in which, Figure 1 is a top plan view. Fig. 2 is a side elevation; and Fig. 3 is a sectional view on the line 3—3 of Fig. 1.

Referring more particularly to the drawings, 1 indicates the plow beam having my improved clevis secured thereto. The clevis 2 is formed of a single bar 3 of heavy sheet iron or other suitable material having its ends 4 arranged parallel with the plow beam and bolted to the top and bottom sides thereof by means of the bolt 5. The bar 3 is bent at right angles to the ends 4, as shown at 6, said bends being disposed in opposite directions and bent to form the offsets 7 which are disposed upon opposite sides of the plow beam.

A substantially horizontal portion 8 extends outwardly from the offset on one side of the plow beam, and an inclined portion 9 extends outwardly from the offset on the other side of the plow beam. The intermediate portion 10 of the bar is twisted, as shown at 11, and disposed in a plane at right angles to the outwardly extending portions 8 and 9, said intermediate portion being provided with a plurality of openings 12 adapted to receive the whiffletree hook 13, said hook being adjusted in the various openings.

It will be seen from the foregoing that the clevis may be turned so that the plow beam can be steered either to the right or left so that the animal will not have to walk close to the furrow.

While I have shown and described the preferred form of my invention, it will be obvious that various changes in the details of construction and in the proportions may be resorted to for successfully carrying my invention into practice without sacrificing any of the novel features or departing from the scope thereof.

Having thus described this invention, what is claimed is:—

In a device of the character described, the combination with a plow beam, of a clevis formed from a single bar of heavy sheet iron, having its ends arranged parallel with and bolted to the top and bottom sides of the plow beam, said bar being bent in its length at right angles to the ends and disposed in opposite directions, offsets formed adjacent said bends and arranged upon the sides of said plow beam, a substantially horizontal portion extending outwardly from the offset on one side of said beam, an inclined portion extending outwardly from the offset on the other side of the plow beam, the intermediate portion of said bar being twisted and arranged in a plane at right angles to the outwardly extending portions, and said intermediate portion being provided with a series of openings to receive a whiffletree hook.

In testimony whereof I hereunto affix my signature in the presence of two witnesses.

SAMUEL T. HOBBS.

Witnesses:
HENRY GLOVER,
EUGENE M. FORD.

Copies of this patent may be obtained for five cents each, by addressing the "Commissioner of Patents, Washington, D. C."